E. PECK.
Cultivator.
No. 70,111.  Patented Oct. 22. 1867.
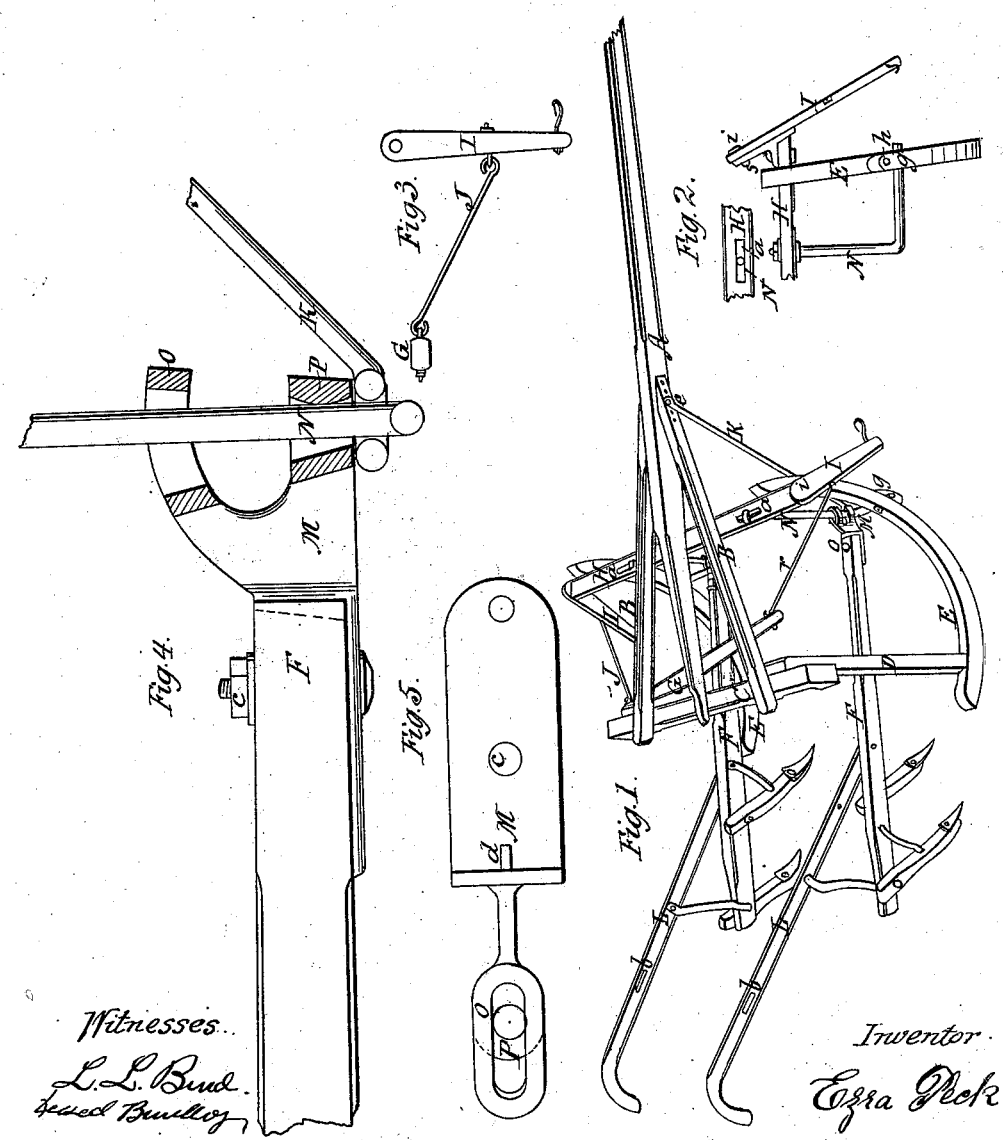

United States Patent Office.

EZRA PECK, OF CHICAGO, ILLINOIS.

Letters Patent No. 70,111, dated October 22, 1867.

---

IMPROVEMENT IN CULTIVATORS.

---

*The Schedule referred to in these Letters Patent and making part of the same.*

---

TO ALL WHOM IT MAY CONCERN:

Be it known that I, EZRA PECK, of the city of Chicago, in the county of Cook, and State of Illinois, have invented certain new and useful Improvements in Cultivators; and I do hereby declare that the following is a full, clear, and exact description of the same, reference being had to the accompanying drawings, making a part of this specification, in which—

Figure 1 is a perspective view.

Figure 2 a view of a portion detached, showing the mode of adjusting the width between the front ends of the plough-beams.

Figure 3, an end view of the draught apparatus detached.

Figure 4, an enlarged view, partly sectional, of the clevis attachment; and

Figure 5, a bottom view of the clevis.

Like letters refer to the same parts in all of the figures.

The nature and object of my invention consist in supporting the framework of a cultivator upon runners; arranging the runners with reference to the ploughs so that the weight to be supported by the runners, when in operation, will be slight; in a novel mode of connecting the plough-beams to the framework by rods and braces and by a new and improved clevis; in a new and improved mode of applying the power of the team; also of adjusting the width of the space between the front ends of the plough-beams; and in the several new arrangements and combinations hereinafter set forth and claimed.

To enable others skilled in the art to make and use my improved cultivator, I will proceed to describe its construction and operation.

My cultivator belongs to that class usually called "straddle row," and the front or principal frame is made by attaching the draught-pole A to the cross-bars H and C, and supporting it at the sides by the braces B, as shown at fig. 1. The posts D are firmly attached to the bar C at their upper ends, and at their lower to the runners E. The runners are made about in the form shown, and that portion which comes in contact with the ground is usually shod with steel plate or other suitable material, and are attached in front to the cross-bar H. For the purpose of attaching the plough-beams adjustably, I cut mortises or slots, $a$, through the bar H, and insert therein the upper ends of the angle-rods N, and fasten them by a shoulder below and nut above, or by other suitable means. These rods N are vertical for about one foot, where they are turned at a right angle and brought to the side immediately in front of runners E by a clamp, $g$, which clamp is secured by the bolt $h$, fig. 2, and is so made or cut that it will press the outer end of the rod N against the runner and hold it securely. By loosening the nut at the upper end and the clamp, the two rods N can be brought nearer together or spread, as may be desired, so as to regulate the width of the front ends of the plough-beams, which are attached to them; they being screwed down and firmly held in place. The front ends of the plough-beams F are also adjusted vertically upon the same rods by means of the draw-braces K. These braces are made and attached so that they can be drawn up or let down by a series of holes, either in the braces B or in the braces K, or by screws, or other suitable device; and as they surround the rods N and prevent them from turning, they also form, on those rods, rests or stops for the clevises $m$, and regulate the distance which they are allowed to fall. For deep cultivating they will be allowed to rest upon the angle of the rods; while for shallow cultivating or ploughing they will be elevated at the upper end or carried forward, so as to raise the point of contact with the rods N several inches, as may be desired. The plough-beams F are attached to the rods N by a peculiar clevis, as shown enlarged at figs. 4 and 5. This clevis $m$ is made of cast iron usually, and has its rear end so made that it can be secured to the beam by a single bolt, $c$, and be prevented from turning on the beam by a lug cast or made on the inside, or by a short bolt driven in. The front end of the clevis is made with a lateral opening of about two and one-half inches in width, and has a vertical hole through both prongs, which is considerably elongated in the upper prong O, so as to allow the rear end to be elevated or depressed, while the lower one, P, is somewhat cut away at the top in the rear of the rod N, and rounded in front, as shown at fig. 4. This clevis, so attached to a vertical rod, admits of a free vertical and swinging movement of the rear ends of the plough-beams, prevents them from turning over, and thereby keeps the ploughs in their proper position. The ploughs Q are attached to the beams F by bent standards in the usual way. The handles L are attached to the side, and inclined to the right or left, so that the operator, when walking, will not tread upon the rows. When it is desired to secure the rear ends together, it is done by inserting a cross-bar through the mortises $b$ in the handles, which bar, when inserted, is provided with holes at one or both ends, so as to adjust the width of the rear and make it correspond with the front. The horses are attached by whiffle-trees placed in the hooks at the lower ends of the swing-bars I. These bars are attached to the machine by castings, $f$, fastened to the ends of the cross-bar H, so as to bring the pivots $i$ above the cross-bar or machine, as shown at fig. 2, and are so bevelled or inclined as to throw the lower ends outwards, so as to secure the proper distance between the horses without increasing the width of the machine or the length of the bar to which they are attached beyond what is required for the other purposes of the machine; and it also brings the rods J nearer in a straight line with the draught, which gives the draught arrangement a much easier movement, and keeps the whole compact. The rods J are pivoted to them a little above the middle, and extend back and are hinged to the ends of the evener G, which evener is hinged to the under side of the tongue just in front of the cross-bar C. In the complete machine the beams F are about four and one-half feet in length. The frame is two feet and two inches high in the clear, and four feet wide at the bottom, with the sides inclined inwards, so as to brace against each other. Suitable hooks are attached to the bar C, so that the beams may be securely elevated for purposes of transportation, and the ploughs may be made to turn the furrow either way by any of the well-known methods, but I prefer to set them at an angle permanently, and throw the furrows to or from the rows by changing sides with the beams, which I consider a decided improvement, for the reason that when the ploughs are reversed without changing their position, the earth and weeds of the first plough are thrown directly in front of the rear plough, and is thus ploughed over again and the weeds turned up, while by changing the position, as is done by changing sides without reversing the ploughs, the earth of the rear plough is always turned into the furrow of the front one. They are easily changed, as by taking out the rods N or bolts $c$ they are detached from the main frame, and only require changing for the different stages of growth in the corn or other products. The machine will be found to run easily upon the ground, as the point of resistance is in the ploughs, and the line of draught such that only the simple weight of the front frame comes upon the runners, so that a driver or operator could be mounted upon the machine without serious detriment to its ease of movement.

Having thus fully described my new and improved cultivator, what I claim as new, and desire to secure by Letters Patent, is—

1. A framework, for carrying and drawing the ploughs of a straddle-row cultivator supported on runners, substantially as described.

2. The frame, supported on runners, in combination with two gangs of ploughs, substantially as specified.

3. The main frame, supported on runners, in combination with adjustable and movable beams F and ploughs Q, substantially as and for the purposes specified.

4. The slotted clevis $m$, provided with an upper and a lower bearing, substantially as specified.

5. The slotted clevis $m$, in combination with the rod N and plough-beam F, substantially as described.

6. The combination and arrangement of the angle-rod N and clevis $m$ with the adjustable brace $k$, for adjusting the elevation of the front end of the beams, substantially as specified.

7. The angle-rods N, in combination with the slots $a$ and clamps $g$, for adjusting the distance between the ends of the beams, substantially as described.

8. The combination and arrangement of the evener G, inclined swing-bars or levers I, rods J, and elevated pivoted supports $f$, substantially as specified.

EZRA PECK.

Witnesses:
L. L. BOND,
DAVID BRADLEY.